(12) United States Patent
Sakamoto

(10) Patent No.: US 9,395,211 B2
(45) Date of Patent: Jul. 19, 2016

(54) RESOLVER FOR DETECTING ROTATIONAL ANGLE OF MOTOR

(71) Applicant: KAYABA INDUSTRY CO., LTD., Tokyo (JP)

(72) Inventor: Suguru Sakamoto, Kanagawa (JP)

(73) Assignee: KYB CORPORATION, Tokyo (JP)

( * ) Notice: Subject to any disclaimer, the term of this patent is extended or adjusted under 35 U.S.C. 154(b) by 100 days.

(21) Appl. No.: 14/386,303

(22) PCT Filed: Mar. 7, 2013

(86) PCT No.: PCT/JP2013/056288
§ 371 (c)(1),
(2) Date: Sep. 18, 2014

(87) PCT Pub. No.: WO2013/146165
PCT Pub. Date: Oct. 3, 2013

(65) Prior Publication Data
US 2015/0097555 A1    Apr. 9, 2015

(30) Foreign Application Priority Data
Mar. 30, 2012 (JP) ................................ 2012-079958

(51) Int. Cl.
*G01D 5/20* (2006.01)
*G01D 11/24* (2006.01)
*G01D 18/00* (2006.01)
*G01D 5/14* (2006.01)

(52) U.S. Cl.
CPC .................. *G01D 5/20* (2013.01); *G01D 5/145* (2013.01); *G01D 5/2046* (2013.01); *G01D 11/245* (2013.01); *G01D 18/00* (2013.01)

(58) Field of Classification Search
CPC ....... G01D 11/245; G01D 18/00; G01D 5/20; G01D 5/145; G01D 5/2046
USPC ......................................... 324/207.18, 207.25
See application file for complete search history.

(56) References Cited

U.S. PATENT DOCUMENTS

| | | | |
|---|---|---|---|
| 7,639,004 B2 * | 12/2009 | Islam | G01L 3/104 324/207.2 |
| 7,791,335 B2 * | 9/2010 | Makino | B62D 5/0403 310/168 |
| 2003/0137295 A1 | 7/2003 | Akutsu et al. | |

(Continued)

FOREIGN PATENT DOCUMENTS

| | | |
|---|---|---|
| EP | 2020590 A2 | 2/2009 |
| EP | 2490324 A2 | 8/2012 |
| JP | 9-252560 A | 9/1997 |
| JP | 2001-145298 A | 5/2001 |
| JP | 2001-330472 A | 11/2001 |

(Continued)

*Primary Examiner* — Jay Patidar
(74) *Attorney, Agent, or Firm* — Rabin & Berdo, P.C.

(57) ABSTRACT

A resolver includes a resolver rotor that is provided in an outer circumference of the motor shaft and rotates integrally with the motor shaft, a resolver stator that has a plurality of coils and surrounds an outer circumference of the resolver rotor such that a rotational angle detection gap is provided between the outer circumference of the resolver rotor and the resolver stator, a housing that houses the resolver rotor and the resolver stator and has an opening for extracting wires of the coils in an outer circumference side of the resolver stator, a wire harnessing member provided to extend from the resolver stator to an outer side of the housing through the opening and consolidates wires of a plurality of the coils, and a cover member that covers a gap between the opening and the wire harnessing member.

5 Claims, 4 Drawing Sheets

(56) References Cited

U.S. PATENT DOCUMENTS

| | | |
|---|---|---|
| 2006/0220479 A1 | 10/2006 | Hasegawa |
| 2008/0036315 A1 | 2/2008 | Makiuchi et al. |
| 2008/0169714 A1 | 7/2008 | Kataoka et al. |
| 2012/0262015 A1* | 10/2012 | Shin .................... G01D 5/2006 310/71 |

FOREIGN PATENT DOCUMENTS

| | | |
|---|---|---|
| JP | 2006-184212 A | 7/2006 |
| JP | 2007-178136 A | 7/2007 |
| JP | 2008-054465 A | 3/2008 |
| JP | 2011-160536 A | 8/2011 |
| WO | WO 2011-046296 A2 | 4/2011 |

* cited by examiner

RESOLVER FOR DETECTING ROTATIONAL ANGLE OF MOTOR

TECHNICAL FIELD

The present invention relates to a resolver that detects a rotational angle of a motor.

BACKGROUND ART

In the related art, a resolver as a rotational angle detection sensor that detects a rotational angle of a motor is provided inside a flange cover fixedly installed in an opening of a motor housing.

The resolver includes a resolver rotor installed in a motor shaft and a resolver stator installed inside a flange cover to surround an outer circumference of the resolver rotor.

The resolver stator has a plurality of teeth protruding toward the inside. The coils wound around the teeth are used as an exciting coil and a detection coil. JP2001-330472A discloses a technique in which terminals of the coils are consolidated using a wire harnessing member provided in an outer circumference side of the resolver stator so that the wire is extracted to the outside.

SUMMARY OF INVENTION

In such a resolver, a rotational angle of the motor shaft is detected based on a variation of a gap permeance between the resolver stator and the resolver rotor caused by rotation of the resolver rotor.

Therefore, in order to improve angle detection accuracy, it is necessary to reduce a mechanical installation error between the resolver rotor and the resolver stator. In this regard, a deviation generated when the resolver is assembled is eliminated by installing the resolver in the flange cover of the motor housing and then swinging the wire harnessing member in a circumferential direction of the resolver.

As described above, the flange cover has an opening for installing the wire harnessing member to extend to the outside from the inside of the cover. In the opening, in order to allow swinging of the wire harnessing member, the circumferential dimension of the opening is set to be larger than the circumferential dimension of the wire harnessing member.

Therefore, since a gap between the wire harnessing member and the opening is generated, a foreign object such as dust or dirt may intrude into the inside of the flange cover through the gap.

It is therefore an object of the present invention to provide a resolver capable of preventing intrusion of a foreign object from the surrounding of the wire harnessing member.

According to one aspect of the present invention, a resolver that is configured to detect a rotational angle of a motor shaft, includes a resolver rotor that is provided in an outer circumference of the motor shaft and rotates integrally with the motor shaft, a resolver stator that has a plurality of coils and surrounds an outer circumference of the resolver rotor such that a rotational angle detection gap is provided between the outer circumference of the resolver rotor and the resolver stator, a housing that houses the resolver rotor and the resolver stator and has an opening for extracting wires of the coils in an outer circumference side of the resolver stator, a wire harnessing member provided to extend from the resolver stator to an outer side of the housing through the opening and consolidate wires of a plurality of the coils, and a cover member that covers a gap between the opening and the wire harnessing member.

The details as well as other features and advantages of the present invention are set forth in the remainder of the specification and are shown in the accompanying drawings.

DESCRIPTION OF EMBODIMENTS

Hereinafter, embodiments of the present invention will be described with reference to the accompanying drawings.

Figure 1:
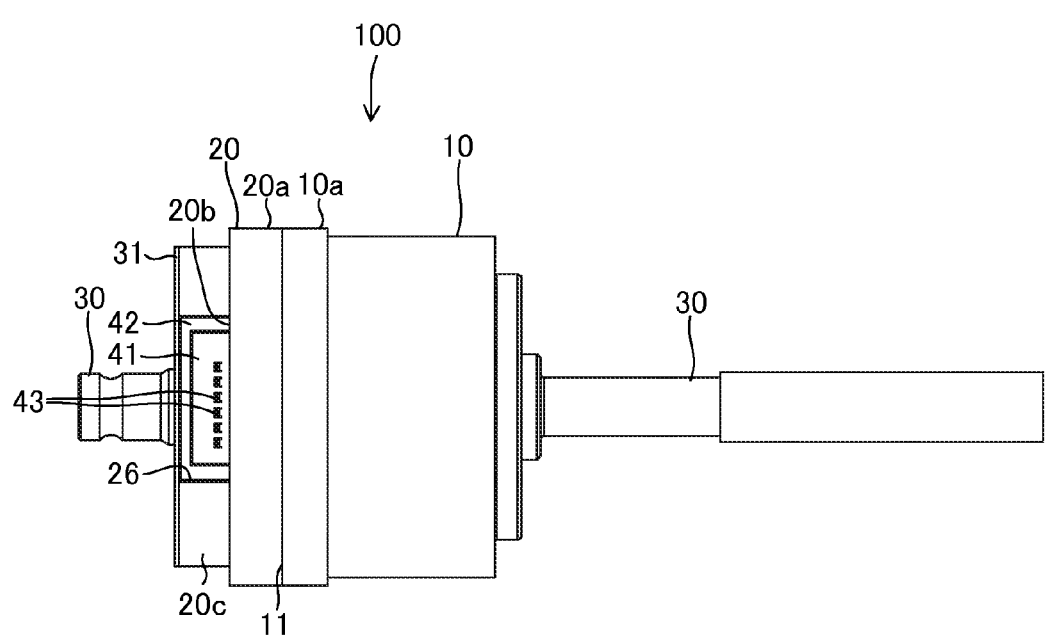
FIG. 1 is a diagram illustrating a motor unit having a resolver according to the present embodiment.

FIG. 1 is a diagram illustrating a motor unit 100 having a resolver 21 according to the present embodiment. The motor unit 100 includes a motor housing 10 that internally houses a motor (not illustrate), a flange cover 20 installed in the opening 11 in one end side of the motor housing 10 to internally house the resolver 21, and a motor shaft 30 installed to extend along a straight line passing through the centers of the flange cover 20 and the motor housing 10.

The motor housing 10 and the flange cover 20 are integrated by fastening a bolt to enlarged diameter portions 10a and 20a in an axial direction of the motor shaft 30 while the enlarged diameter portions 10a and 20a face each other. An end cover 31 having a hole where the motor shaft 30 passes in the center is installed in the side of the flange cover 20 opposite to the motor housing 10.

A motor (not illustrated) includes a rotor provided in the outer circumference of the motor shaft 30 and a stator provided in the inner circumference of the motor housing 10 to surround the outer circumference of the rotor.

Figure 2:
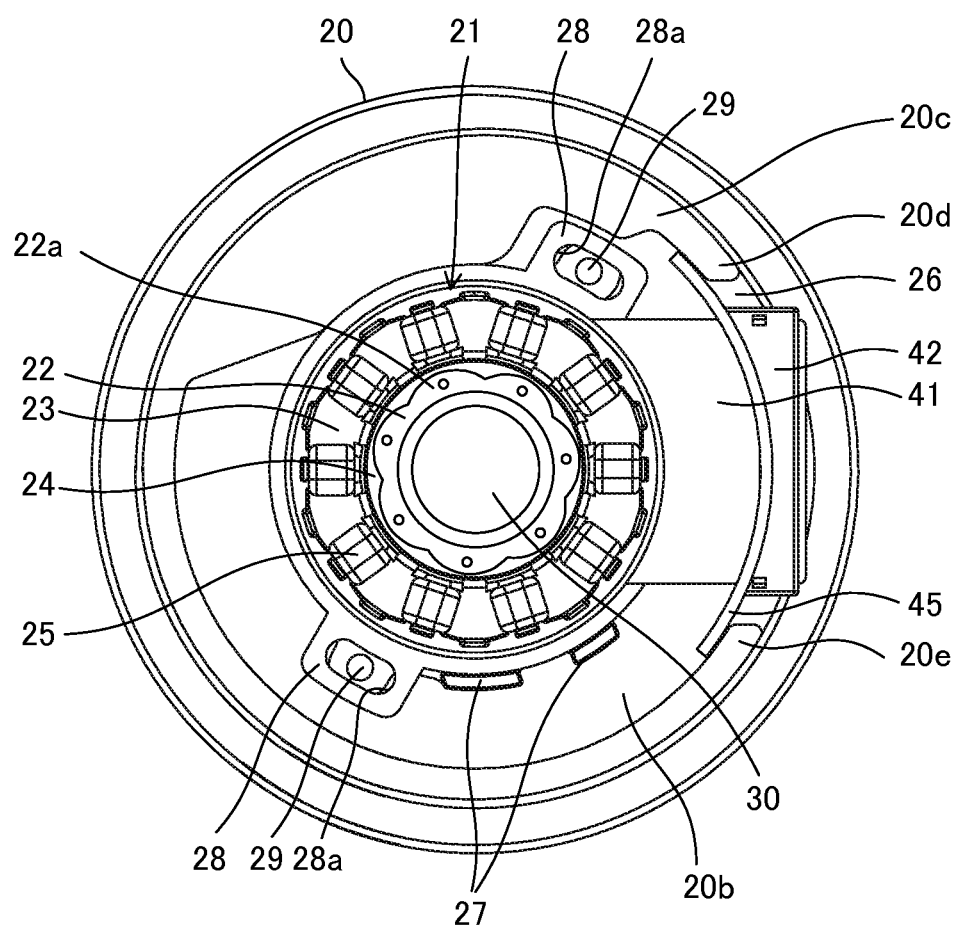
FIG. 2 is a diagram illustrating a motor unit of FIG. 1 as seen from an axial direction of the resolver side.

FIG. 2 is a diagram illustrating the motor unit 100 of FIG. 1 as seen from the axial direction of the resolver 21 side. In FIG. 2, the end cover 31 is not illustrated intentionally in order to visualize a configuration of the resolver 21.

The resolver 21 includes a resolver rotor 22 provided in the outer circumference of the motor shaft 30 and a resolver stator 23 provided in the inner circumference of the flange cover 20 to surround the outer circumference of the resolver rotor 22. A predetermined rotational angle detection gap 24 is provided between the outer circumference of the resolver rotor 22 and the inner circumference of the resolver stator 23.

The resolver rotor 22 is formed in a non-circular shape obtained by uniformly arranging a plurality of arc-shaped swelling portions 22a around the outer circumference. Each arc-shaped swelling portion 22a has a predetermined rotational angle detection gap 24 between the resolver stator 23 and the resolver rotor 22.

The resolver stator 23 has a plurality of teeth (not illustrated) having a ring shape and protruding toward the inner circumference across the circumferential direction. A copper wire is wound around each tooth to form a coil 25. A part of the coils 25 serve as an exciting coil, and the remaining coils 25 serve as a detection coil.

That is, as the resolver rotor 22 is rotated, a gap 24 between the outer circumference of the resolver rotor 22 and the inner circumference of the resolver stator 23 changes, and the gap permeance also changes. Based on such a change, it is possible to detect a rotational angle of the resolver rotor 22, that is, the motor shaft 30.

Inside the flange cover 20, a bulging portion 20c bulging from the bottom surface 20b of the flange cover 20 toward the axial direction is formed in an arc shape. The bulging portion 20c forms a resolver-housing space between the end cover 31 and the bottom surface 20b of the flange cover 20 by installing the end cover 31 as illustrated in FIG. 1.

In a position where the bulging portion 20c of the flange cover 20 is obstructed in the circumferential direction (right end in FIG. 2), an opening 26 causing the resolver-housing space to communicate with the outside is provided. The opening 26 has a rectangular shape. As illustrated in FIG. 1, in the axial direction of the motor shaft 30, an opening is formed from the flange cover 20 to the end cover 31. As illustrated in FIG. 2, in the circumferential direction of the motor shaft 30, an opening is formed from one end 20d of the portion, where the bulging portion 20c is obstructed, to the other end 20e.

A pair of protrusions 27 are provided in the outer circumference side (lower side in FIG. 2) of the resolver stator 23, which is the bottom surface 20b of the flange cover 20. The resolver stator 23 is inserted between the inner circumferential surface of the bulging portion 20c and the inner circumferential surface of the protrusion 27 so as to be positioned in the radial direction.

In addition, the resolver stator 23 has a pair of extending portions 28 provided to extend to the outer circumference from the ring-shaped resolver stator 23. The extending portions 28 are provided with a bolt insertion hole 28a where a bolt is inserted. The resolver stator 23 can be fixed to a desired position in the circumferential direction by inserting and fastening a bolt to the bolt fastening hole 29 provided in the bottom surface 20b of the flange cover 20 from the near side of the extending portion 28 in the axial direction.

The resolver 21 further includes a wire harnessing member 41 provided to extend in a radial direction of the motor shaft 30 from an end of the opening 26 side of the resolver stator 23 to the outside of the opening 26 through the opening 26 and a cover member 42 that covers a gap between the wire harnessing member 41 and the opening 26.

The wire harnessing member 41 has a rectangular shape smaller than the opening 26 as illustrated in FIG. 1 and is used to consolidate coil terminals of each coil 25 of the resolver stator 23 and extract the coils 25 to the outside of the flange cover 20. A harness extraction hole 43 for extracting a plurality of harnesses obtained by binding the coil terminals is provided in the outer end surface of the wire harnessing member 41.

In order to improve angle detection accuracy of the resolver 21, it is necessary to reduce a mechanical installation error of the resolver rotor 22 and the resolver stator 23. In this regard, it is necessary to fix the resolver stator 23 in a position, suitable for eliminating a deviation generated when the resolver 21 is assembled, by swinging the wire harnessing member 41 in the circumferential direction of the resolver 21 after the resolver 21 is installed in the flange cover 20. For this reason, a gap is provided between the wire harnessing member 41 and the opening 26 as described above. However, a foreign object such as dust or dirt may intrude into the flange cover 20 through this gap.

In this regard, according to the present embodiment, a cover member 42 that covers a surrounding of the wire harnessing member 41 is provided. Hereinafter, the cover member 42 will be described.

Figure 3A:
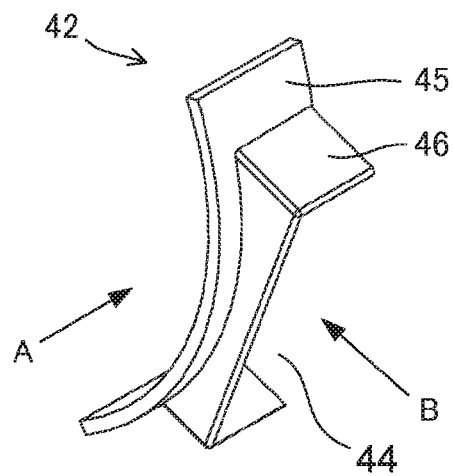
FIG. 3A is a perspective view illustrating a cover member.
Figure 3B:
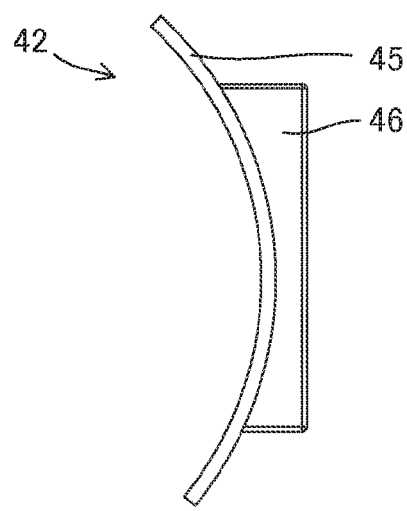
FIG. 3B is a diagram illustrating the cover member of FIG. 3A as seen from a direction A.
Figure 3C:
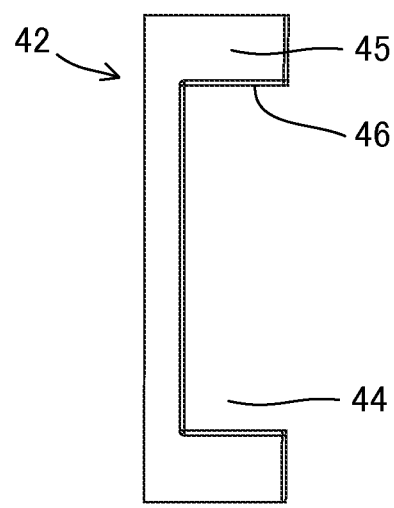
FIG. 3C is a diagram illustrating the cover member of FIG. 3A as seen from a direction B.

FIG. 3A is a perspective view illustrating the cover member 42. FIG. 3B is a diagram illustrating the cover member 42 of FIG. 3A as seen from a direction A. FIG. 3C is a diagram illustrating the cover member 42 of FIG. 3A as seen from a direction B.

The cover member 42 includes a base portion 45 having a curved surface in an arc shape and a notch 44 having a dimension nearly matching an external dimension of the wire harnessing member 41 and an abutting portion 46 provided to extend from an outer edge of the notch 44 of the base portion 45 to the outside of the base portion 45 in a radial direction and abut on three sides of the wire harnessing member 41.

As illustrated in FIG. 2, a length of the base portion 45 in the circumferential direction is longer than that of the terminal of the bulging portion 20c of the flange cover 20, that is, longer than the length of the opening 26 in a circumferential direction (dimension between both ends 20d and 20e). As a result, the outer circumferential surfaces of both ends of the base portion 45 in the circumferential direction abut on the inner circumferential surfaces of both ends 20d and 20e of the bulging portion 20c, respectively.

The width of the base portion 45 in the axial direction is set to nearly match the dimension between the bottom surface 20b of the flange cover 20 and the end cover 31 as illustrated in FIGS. 1 and 3C. As a result, both end surfaces of the base portion 45 in the axial direction (horizontal direction in FIG. 3C) abut on the bottom surface 20b of the flange cover 20 and the inner surface of the end cover 31, respectively.

The cover member 42 is configured as described above and is installed from the end cover 31 side such that the base portion 45 abuts on the inner circumference side of the bulging portion 20c, and the abutting portion 46 abuts on the side surface of the wire harnessing member 41 on three sides after the resolver rotor 22 and the resolver stator 23 are installed in the flange cover 20. Then, the end cover 31 is installed. As a result, the resolver 21 is housed in the flange cover 20.

As described above, since the motor side of the wire harnessing member 41 abuts on the bottom surface 20b of the flange cover 20, it is possible to prevent intrusion of a foreign object. In addition, the remaining three sides of the wire harnessing member 41 are covered by the cover member 42. Therefore, it is possible to prevent intrusion of a foreign object regardless of a swinging position of the wire harnessing member 41 at the time of adjustment.

According to the embodiment described above, it is possible to obtain the following effects.

The resolver 21 according to the present embodiment has the cover member 42 that covers a gap between the opening 26 of the flange cover 20 and the wire harnessing member 41. Therefore, it is possible to prevent intrusion of a foreign object such as dirt or dust from the gap between the opening 26 and the wire harnessing member 41.

In addition, the cover member 42 includes the base portion 45 having a curved surface in an arc shape and the notch 44 having a dimension nearly matching an external dimension of the wire harnessing member 41 and an abutting portion 46 provided to extend from the outer edge of the notch 44 of the base portion 45 to the outside of the base portion 45 in the radial direction and abut on three sides of the wire harnessing member 41. Therefore, a gap between the wire harnessing member 41 and the opening 26 is covered by the base portion 45, and the cover member 42 pressedly abuts on the wire harnessing member 41 using the abutting portion 46. As a result, it is possible to reliably prevent intrusion of a foreign object.

The length of the base portion 45 of the cover member 42 in the circumferential direction is set to be longer than the length of the opening 26 in the circumferential direction, so that the cover member 42 covers the opening 26 regardless of the position of the wire harnessing member 41 in the circumferential direction. Therefore, it is possible to prevent intrusion of a foreign object from the gap between the opening 26 and the wire harnessing member 41, regardless of a swinging position of the wire harnessing member 41 at the time of adjustment.

Since the width of the base portion 45 of the cover member 42 in the axial direction is set to nearly match the dimension of the gap between the bottom surface 20b of the flange cover 20 and the end cover 31, and the abutting portion abuts on three sides of the wire harnessing member 41, it is possible to cover the opening 26 across the axial direction. Therefore, it is possible to more reliably prevent intrusion of a foreign object from the gap between the opening 26 and the wire harnessing member 41.

Embodiments of the present invention were described above, but the above embodiments are merely examples of applications of the present invention, and the technical scope of the present invention is not limited to the specific constitutions of the above embodiments.

Although description of the present embodiment has been made by exemplifying a variable reluctance (VR) type resolver 21, the invention may similarly apply to other types of resolvers.

This application claims priority based on Japanese Patent Application No. 2012-79958 filed with the Japan Patent Office on Mar. 30, 2012, the entire contents of which are incorporated into this specification.

The invention claimed is:

1. A resolver that is configured to detect a rotational angle of a motor shaft, comprising:
   a resolver rotor that is provided in an outer circumference of the motor shaft and rotates integrally with the motor shaft;
   a resolver stator that has a plurality of coils and surrounds an outer circumference of the resolver rotor such that a rotational angle detection gap is provided between the outer circumference of the resolver rotor and the resolver stator;
   a housing that houses the resolver rotor and the resolver stator and has an opening for extracting wires of the coils in an outer circumference side of the resolver stator;
   a wire harnessing member provided to extend from the resolver stator to an outer side of the housing through the opening and consolidates wires of a plurality of the coils; and
   a cover member that covers a gap between the opening and the wire harnessing member,
   wherein
   the opening is directed to a radial direction,
   the cover member has a base portion having a curved surface in an arc shape that has a dimension longer than a dimension of the opening in a circumferential direction, and
   the cover member is configured to swing together with the wire harnessing member in the circumferential. direction so as to cover the opening regardless of a circumferential position the wire harnessing member.

2. A resolver that s configured to detect a rotational angle of a motor shaft, comprising:
   a resolver rotor that is provided in an outer circumference of the motor shaft and rotates integrally with the motor shaft;
   a resolver stator that has a plurality of coils and surrounds an outer circumference of the resolver rotor such that a rotational angle detection gap is provided between the outer circumference of the resolver rotor and the resolver stator;
   a housing that houses the resolver rotor and the resolver stator and has an opening for extracting wires of the coils in an outer circumference side of the resolver stator;
   a wire harnessing member provided to extend from the resolver stator to an outer side of the housing through the opening and consolidates wires of a plurality of the coils; and
   a cover member that covers a gap between the opening and the wire harnessing member, the cover member comprising:
   a base portion having a curved surface in an arc shape and a notch having a dimension matching an external dimension of the wire harnessing member; and
   an abutting portion provided to extend from an outer edge of the notch to an outer side of the base portion in a radial direction and abuts on three sides of the wire harnessing member.

3. The resolver according to claim 2, wherein the curved surface has a dimension longer than a dimension of the opening in a circumferential direction, and the cover member is configured to swing together with the wire harnessing member in the circumferential direction so as to cover the opening regardless of a circumferential position of the wire harnessing member.

4. The resolver according to claim 3, wherein the dimension of the base portion in an axial direction matches a dimension of the opening in the axial direction.

5. The resolver according to claim 2, wherein the dimension of the base portion in an axial direction matches the dimension of the opening in the axial direction.

* * * * *